(12) United States Patent
Verma et al.

(10) Patent No.: US 7,046,998 B2
(45) Date of Patent: May 16, 2006

(54) MULTIMEDIA CONTENT DELIVERY THROUGH WLAN COVERAGE AREA

(75) Inventors: Shaily Verma, Mumbai (IN); Charles Chuanming Wang, Jamison, PA (US); Jun Li, Plainsboro, NJ (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 10/518,581

(22) PCT Filed: Jun. 20, 2003

(86) PCT No.: PCT/US03/19431

§ 371 (c)(1),
(2), (4) Date: Dec. 21, 2004

(87) PCT Pub. No.: WO2004/062114

PCT Pub. Date: Jul. 22, 2004

(65) Prior Publication Data

US 2005/0181776 A1 Aug. 18, 2005

Related U.S. Application Data

(60) Provisional application No. 60/390,837, filed on Jun. 21, 2002.

(51) Int. Cl.
*H04Q 7/20* (2006.01)
(52) U.S. Cl. ........................ 455/418; 455/411
(58) Field of Classification Search ............... 455/418, 455/419, 420, 566, 552.1, 414.1, 411, 422.1; 370/315, 331, 338, 439; 709/203, 217, 219, 709/229, 231, 221, 226; 707/200; 380/278, 380/248, 270, 247; 713/202, 260, 182
See application file for complete search history.

(56) References Cited

U.S. PATENT DOCUMENTS

| | | | |
|---|---|---|---|
| 5,854,978 A | 12/1998 | Heidari | |
| 6,546,243 B1 * | 4/2003 | Tiedemann et al. | 455/419 |
| 6,546,246 B1 | 4/2003 | Bridges et al. | |
| 6,546,250 B1 | 4/2003 | Turcotte et al. | |
| 6,721,578 B1 * | 4/2004 | Minear et al. | 455/566 |
| 6,823,055 B1 * | 11/2004 | Mayer et al. | 379/201.05 |
| 6,846,239 B1 * | 1/2005 | Washio | 463/40 |
| 6,868,440 B1 * | 3/2005 | Gupta et al. | 709/219 |
| 2002/0087656 A1 * | 7/2002 | Gargiulo et al. | 709/217 |
| 2002/0123336 A1 * | 9/2002 | Kamada | 455/420 |
| 2002/0172368 A1 * | 11/2002 | Peterka | 380/278 |
| 2002/0176382 A1 * | 11/2002 | Madour et al. | 370/331 |
| 2003/0065802 A1 * | 4/2003 | Vitikainen et al. | 709/231 |
| 2004/0005900 A1 * | 1/2004 | Zilliacus | 455/466 |
| 2004/0010602 A1 * | 1/2004 | Van Vleck et al. | 709/229 |
| 2004/0081110 A1 * | 4/2004 | Koskimies | 370/315 |
| 2004/0128324 A1 * | 7/2004 | Sheynman et al. | 707/200 |

OTHER PUBLICATIONS

Copy of Search Report dated Jul. 8, 2004.

* cited by examiner

*Primary Examiner*—Jean Gelin
(74) *Attorney, Agent, or Firm*—Joseph J. Laks; Robert D. Shedd; Catherine A. Ferguson

(57) ABSTRACT

A system for transferring content includes a wireless local area network (WLAN) and a network module provided within the WLAN or a cellular network to alert users of available content in the WLAN and handle user requests made for content when a user has access to the cellular network. The network module, which may comprise an interworking function, delivers the content to the user through the WLAN when the user is present in a coverage area of the WLAN. The invention allows a user to view the programs available for download and request a specific program using a relatively low speed network, such as a cellular network, and download the program through a high speed network, such as a WLAN.

19 Claims, 2 Drawing Sheets

MULTIMEDIA CONTENT DELIVERY THROUGH WLAN COVERAGE AREA

This application claims the benefit, under 35 U.S.C. § 365 of International Application PCT/US03/19431, filed Jun. 20, 2003, which was published in accordance with PCT Article 21(2) on Jul. 22, 2004 in English and which claims the benefit of U.S. provisional patent application No. 60/390,837, filed Jun. 21, 2002.

FIELD OF THE INVENTION

The present invention generally relates to network communications and, more particularly, to a method and system for transmitting a program to a mobile terminal in an interworking environment that includes a cellular network and a relatively high speed Wireless Local Area Networks (WLAN) for improved low cost service of multimedia content delivery.

BACKGROUND OF THE INVENTION

Universal Mobile Telecommunications System (UMTS) is a 'third generation' (3G) mobile communications system developed within a framework known as IMT-2000 (International Mobile Telecommunications-2000). UMTS will play a key role in creating the mass market for high-quality wireless multimedia communications. UMTS will enable many wireless capabilities, delivering high-value broadband information, commerce and entertainment services to mobile users. UMTS will speed convergence between telecommunications, information technology, media and content industries to deliver new services and create revenue-generating services. Compared to its 2G or 2.5G wireless cellular counterpart, UMTS will deliver low-cost, high-capacity mobile communications with data rates on the order of 2 Mbit/sec under stationary conditions with global roaming and other advanced capabilities.

One drawback of the UMTS network is high cost of spectrum and low data rates as compared to WLANs (Wireless Local Area Networks). The overall cost of a cellular infrastructure is very high compared to the cost of a WLAN infrastructure both in terms of cost of the spectrum, which in the case of WLAN is free, and the overall system cost for the supported bandwidth. On the other hand, it is more difficult for a WLAN to have the wide area coverage offered by a cellular system. In order to have the advantages from both cellular and WLAN technologies, the WLAN may be an extension of the cellular network in hotspot areas.

It would be advantageous to provide a system and method for user equipment (UE) to request a download of a program and actually download the program using the advantageous features of the cellular network and the WLAN. In this way, multimedia service can be improved and delivered at a low cost.

SUMMARY OF THE INVENTION

A system for transferring content includes a wireless local area network (WLAN) and a network module provided within the WLAN or a cellular network to alert users of available content in the WLAN and handle user requests made for content when a user has access to the cellular network. The network module delivers the content to the user through the WLAN when the user is present in a coverage area of the WLAN. In one embodiment, the user may request programs that are stored locally on the WLAN.

In another embodiment, the user request programs that are retrieved from the cellular network or the Internet and transmitted to the user through the WLAN.

In other embodiments, the network module may include means for identifying when a user is present in the coverage area of the WLAN. The network module may interface between the WLAN and a Universal Mobile Telecommunications System (UMTS) or a General Packet Radio Service (GPRS) system. The network module may receive requests for content by user-entered identifiers. The system may include means for alerting users of available content at a given WLAN, and the means for alerting users of available content may include a program guide available through the cellular network or through the Internet.

The network module may be coupled to an application server, which stores content for downloading from the WLAN in accordance with user requests, or the network module may store the content. The content may be stored within the cellular network and the network module may employ directory servers to find content within the cellular network for downloading to the WLAN in accordance with user requests. The system may include means for billing the user for delivering the content. The network module may include an interworking function or be included within an interworking function.

A method for delivering content according to one aspect of the invention comprises: receiving, from a first wireless network, guide information related to programs available for downloading; selecting a particular program for downloading in response to the guide information; transmitting selection information to the first wireless network; detecting the presence of a coverage area of a second wireless network, the second wireless network and the first wireless network having an interworking function therebetween; attaching to the second wireless network and authenticating via the first wireless network; and receiving the program from the second wireless network in response to the authentication.

A method for delivering content according to another aspect of the invention comprises: coupling the first wireless network to a second wireless network via an interworking function; receiving identification information from a mobile terminal and registering the mobile terminal with the first wireless network; transmitting the mobile terminal identification information to the second wireless network via the interworking function; receiving authentication information from the second wireless network; and receiving program identification information from the mobile terminal; receiving second program identification information from the second wireless network; comparing the program identification and the second program identification; and transmitting a requested program to the mobile terminal in response to the authentication information and the comparison of the first and second program identifications.

BRIEF DESCRIPTION OF THE DRAWINGS

The advantages, nature, and various additional features of the invention will appear more fully upon consideration of the illustrative embodiments now to be described in detail in connection with accompanying drawings wherein.

Figure 1:
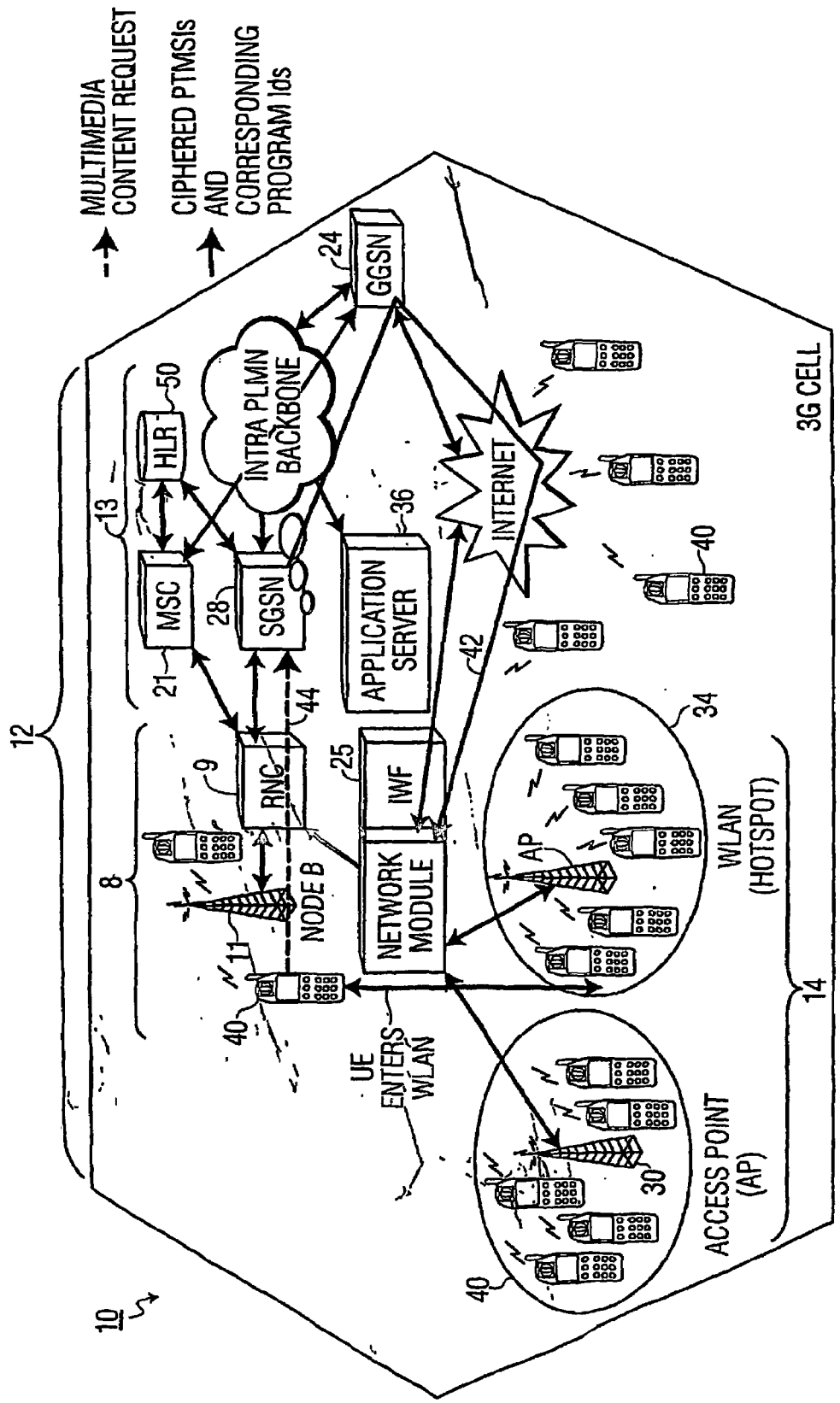
FIG. 1 is an exemplary system architecture for a system employing WLAN content delivery in accordance with the present invention.

It should be understood that the drawings are for purposes of illustrating the concepts of the invention and are not necessarily the only possible configuration for illustrating the invention.

DETAILED DESCRIPTION OF THE INVENTION

The present invention provides a method and system for improving content delivery services for multimedia delivery. In accordance with the present invention, a request made from user equipment (UE) for multimedia content delivery for a predetermined set of programs may be made with the constraint that the content be picked up in a WLAN coverage area. These WLAN coverage areas may be well-known locations such as a gas station on a highway, a coffee shop on one's way home or a specially designated request center. From such a location, multimedia service can be delivered at a low cost using the high bandwidth available for WLAN systems. A 3G operator (cellular system operator) may provide this service or assist in the service provision as the 3G operator does not lose customers due to high charges of multimedia content delivery over a pure UMTS network or high speed services in independent WLANs, and the 3G billing system can be reused.

One of the major issues in the wireless world is multimedia content delivery, which is generally prohibitively expensive over a pure UMTS network in terms of Mbits/per cent. As used herein the term multimedia content includes any program that includes video and/or audio components. The present invention advantageously delivers multimedia content at high data rates while in WLAN coverage areas but is tied back to the 3G operator so that the 3G operator does not lose its customer base. In one preferred embodiment, the user has the advantage of making the request anywhere in the 3G cells so that the requested content is waiting to be downloaded to his device in a WLAN coverage area of the user's choice at much lower prices than in a pure UMTS network but at much higher data rates.

The 3G operator has the convenience of reusing the 3G billing mechanism and utilizing the high data rates possible in WLANs to deliver content while still retaining network customers. The ideas in this invention can work with any system, e.g., GPRS/CDMA 2000, which can to interwork with WLANs.

It is to be understood that the present invention is described in terms of a 3G system with WLANs; however, the present invention is much broader and may include any cellular system with WLAN in which multimedia documents can be transferred. In addition, the present invention is applicable to any system ordering method including orders taken by telephone, set top boxes, computer, satellite links, etc. where the user equipment has access to a WLAN or WLAN(s).

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

Referring now in specific detail to the drawings in which like reference numerals identify similar or identical elements throughout the several views, and initially to FIG. 1, system architecture 10 within a $3^{rd}$Generation Cellular Cell (3G cell) is illustratively shown for integrating voice, data, video and other services over wireless/radio networks. System architecture 10 is presented as an exemplary WLAN-UMTS environment for employing the inventive method and system in accordance with the present invention. Details of the individual block components making up the system architecture which are known to skilled artisans will only be described in details sufficient for an understanding of the present invention.

The present invention is illustratively described in terms of a UMTS network 12 and a WLAN wireless network 14 (e.g., IEEE 802.11 and HIPERLAN2 standards may be employed by these networks). UMTS mobile network 12 (e.g., a third generation (3G) network) communicates with a radio access network (RAN) 8 which comprises a Node B 11 and Radio Network Controller (RNC) 9. WLAN (14) may be connected to UMTS network (12) through the Internet 7 via the GGSN (GPRS Gateway Support Node 24). Other connections are possible as known to those skilled in the art. The RAN 8 in turn is attached to a Core Network (CN) 13 which comprises packet based services such as a SGSN (Serving GPRS Support Node) 28, circuit based services, accesses through the MSC (Mobile Switching Center) 21 and gateways to other PLMNs (Public Mobile Land Networks), such as GGSN (Gateway GPRS Support Node) 24. Core network 13 also supports connections/interfaces with public switched telephone networks (PSTN) 5 and the Internet 7.

Other components may be included in a UMTS network. For example, a home location register (HLR) 50 may be provided which stores the home locations of mobile stations (MS) 40. By the present invention, network 12 (e.g., a PLMN) is interfaced to a wireless LAN 14 through the Internet by employing a network module 25, which may be employed to alert users of available content stored for download a WLAN. MS 40 connects at an access point 30, and MS 40 may roam between the radio access networks.

Network module 25 includes memory for storing content, which may be downloaded to a user present within a WLAN. Network module 25 may be provided in a WLAN, in a cell of a cellular network, as in interface between networks or distributed between the networks. Module 25 may be employed to alert users of available content in the WLAN and handle user requests made for content when a user has access to the cellular network. The network module 25 may be employed for delivering the content to the user through the WLAN when the user is present in a coverage area of the WLAN. Network module 25 may be implemented in an interworking function (IWF) or may be implemented as an interworking function. Network module 25 may be implemented as a stand-alone unit or distributed among the networks it services.

In one embodiment, module 25 may include a WLAN Interworking function (IWF), which will detect the presence of a mobile once it has been authenticated by the WLAN Access Point (AP) and download the content pending for the mobile based on the parameters discussed later. The role of the IWF will be based on the coupling between the WLAN and the UMTS network. In tight coupling, where the IWF connects to the core network of the UMTS, the IWF will reuse UMTS security mechanisms but in loose coupling, where the IWF connects directly to the Internet, the IWF will need security mechanisms with the GGSN to provide encrypted parameters over the Internet. The IWF will also need an adaptation layer to extract the parameters submitted by the PLMN and those provided by the mobile to facilitate content downloading to the correct mobile.

The present invention will be illustratively described with module 25 as an IWF; however, module 25 may be implemented as a separate unit with all the functionality as described herein for IWF.

The WLAN 14 includes a plurality of access points 30 which are provided to permit wireless user equipment (UE) or mobile stations (MS) 40 to access and use the WLAN. By the present invention, the module 25 interacts with the UMTS network 12 and interfaces to a WLAN environment. Module 25 includes hardware and software for translating data packet protocols and other communications between networks (e.g., WLAN and UMTS).

UMTS-WLAN Interworking

The present invention may be employed in the UMTS and WLAN (802.11 and HIPERLAN2) wireless network environments. As described above, the 3G UMTS mobile communicates with the radio access network (RAN) 8 comprising Node B 11 and Radio Network Controller (RNC) 9. The RAN 8 in turn is attached to the Core Network (CN) 13 comprising SGSN 28 (packet based services), MSC (Mobile Switching Center) 21 (circuit based services) and GGSN 24 (gateway to other PLMNs). The drawback of the UMTS network is high cost of spectrum and low data rates as compared to WLANs. It is thus advantageous to replace UMTS with unlicensed band, high data rate WLANs such as IEEE 802.11 and ETSI Hiperlan2 in order to save UMTS radio resources and increase the efficiency of the UMTS RAN. To accomplish this, the mobile terminal needs to have a dual stack comprising a protocol stack of the UMTS UE and the WLAN MS. The dual-protocol stack permits interfacing between the WLAN protocols and UMTS protocols to provide seamless communications between the WLAN and the UMTS. These dual-protocol stacks may be implemented such that the mobile station uses the WLAN MS stack in the WLAN and the UMTS UE stack in the UMTS.

In FIG. 1, architecture 10 for multimedia content delivery through WLAN coverage areas using a UMTS/GPRS program guide is illustratively shown. A number of access points 30 are tied back to the network module 25 which may include an IWF (interworking function) or be included in an IWF, which, in turn, is connected to the 3G network either through the Internet 7 or through a dedicated link to the core network (CN) 13.

Request Phase

The network module 25 may act as a server and cache content. In one embodiment, predetermined content may be based on popularity, for example, the top 50 movies released on DVD, top 50 songs, region-based concerts, etc. Optionally, an IWF 25 may also be attached to a content server or application server 36. Application server 36 may include information or programs stored therein or of particular interest, such that subscribers may wish to download the content thereof in accordance with the present invention. The 3G operator or other facilitator may advertise these programs to the UEs (for example, near or within WLANs) through a program guide or other means. The SGSN 28 can track the location of the UE 40 down by requesting the RNC 9 to report where the MS 40 is currently located, or to report when the MS 40 moves into or out of a given service area by using a Location Reporting Procedure. This procedure relates to location services (LCS) in Iu mode, which is known in the art.

Using 3G location based services, the 3G operator can advertise the content of nearby IWFs or content caches to the UE through its home page program guide along with the nearest WLAN coverage areas that the user can download the multimedia content from. The WLAN download system of the present invention may also be a means for attracting users to a particular location. For example, if a movie premiere is opening or a new recording is being released, a free download may be made available at or near that location for a scene from the film or a portion of a song from the recording. Other uses are also contemplated. For example, new map data may be downloaded to a global positioning satellite device as a user enters a new territory in a vehicle.

If searching for content, the user, upon finding desirable content, can select a particular program available in the WLAN coverage area and convey the program identifier (PID) to the UMTS network to request for specific content at the WLAN coverage area most convenient for him. Since the UMTS network already has a centralized billing system, the user may be charged with a single click or have an account debited accordingly.

The 3G operator either owns the multimedia service or may assist the multimedia service provider for a fee, as 3G operator also gains by retaining customers. Thus, the 3G network has security procedures in place with the IWF 25 (e.g., key exchanges). The SGSN 28 can have an application server 36 sitting on top of it that can handle the requests from the UEs and authenticate and bill customers using 3G mechanisms. Alternatively, the SGSN 28 can forward the requests transparently to an application server that can handle the requests from the UEs and keep track of requested content for billing purposes. The application server 36 will also periodically send all the multimedia requests coming from a particular node B's coverage area or a particular location (depending on the implementation) to the module or IWF 25 that is nearest to that area using the location services of the UMTS network. This may be done by forwarding ciphered PTMSIs (Packet Temporary Mobile Subscriber Identifier) of the UEs requesting the multimedia content coupled with the corresponding program Ids (PIDs) to the IWF 25 through the GGSN 24 and the Internet 7 (if no direct link exists between the GGSN 24 and the IWF 25). An illustrative path for ciphered PTMSIs is indicated in FIG. 1 as path 42.

Delivery Phase

When the UE 40 enters the WLAN coverage area 14, it registers with the access point (AP) 30. The WLAN-UMTS coupling will handle the registration and security issues using known methods. After completing WLAN security procedures, the UE sends ciphered PTMSI and optionally PID to the AP 30. The AP 30 then forwards this information to the IWF 25, which compares the information passed to the AP 30 by the application server 36, with that received from the UE. In case of a match, AP 30 forwards the content requested to the UE at the maximum data rate possible.

Alternatively, application server 36 uses and includes directory servers to find the requested multimedia content (path 44 shows a request routing path in FIG. 1) in the content delivery network and forwards the content as well as the ciphered PTMSIs and PIDS to the IWF 25 where the UE 40 is going to pick up the content. In that case, the UE has a broader range of programs to choose from and is not restricted to a limited set of content available at the IWF or local WLAN caches.

The present invention provides multimedia content in a simple manner to cellular consumers, e.g., 3G consumers, without taking up expensive UMTS bandwidths. This results in lower charges for the customer and faster downloads and access. The 3G operator retains control of its customer base and may attract new customers by offering expanded and improved service. The billing and accounting mechanisms for the UMTS system are preferably maintained and re-used by the present invention. At the low data rates available in 3G, not only will the content delivery service be expensive, but also drain user equipment batteries due to slower download speeds. The WLAN-UMTS interworking of the present-invention can help to avoid this. A single WLAN operator may be employed to serve a number of 3G operators with a content kiosk for each operator in a same hotspot region.

Figure 2:
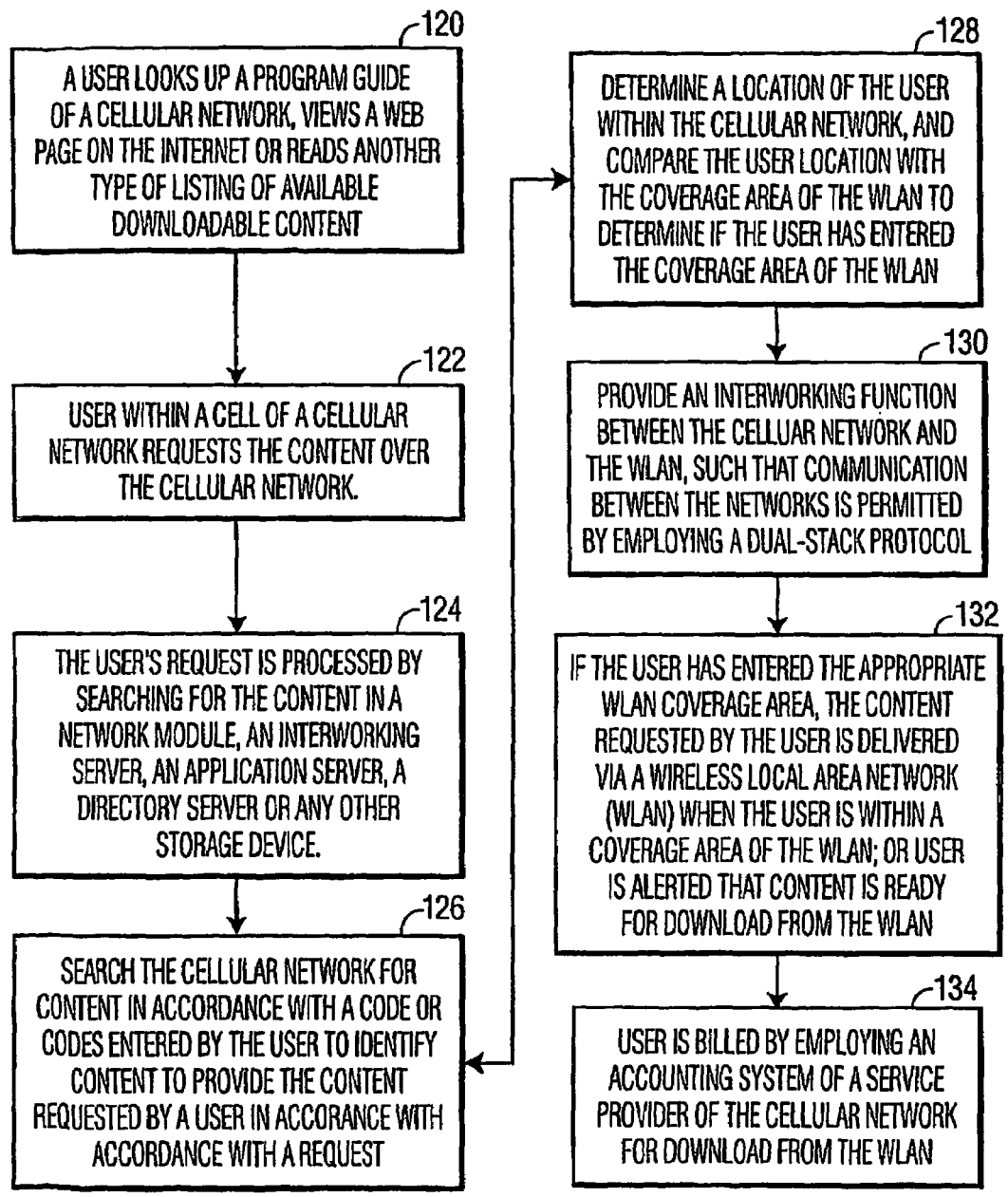
FIG. 2 is a block/flow diagram of an illustrative method for content delivery in accordance with an embodiment of the present invention.

Referring to FIG. 2, a block/flow diagram illustratively shows a method for delivering content pursuant to a user request in accordance with the present invention. In block 120, a user receives a program guide of a cellular network, views a web page on the Internet or reads another type of listing of available downloadable content that informs the users of content available for downloading in the coverage area of a WLAN. The guide may also provide location listing of nearby WLANs. In block 122, the user within a cell of the cellular network requests the content over the cellular network. The user's request is processed by searching for the content in a network module, an interworking server, an application server, a directory server or any other storage device in block 124. This searching may include searching the cellular network for content in accordance with a code or codes entered by the user to identify content in order to provide the content requested by a user in accordance with a request in block 126.

The processing of the request may include determining a location of the user within the cellular network, and comparing the user location with the coverage area of the WLAN to determine if the user has entered the coverage area of the WLAN in block 128. By providing an interworking function between the cellular network and the WLAN, communication between the networks is permitted by employing a dual-stack protocol in block 130.

In block 132, if the user has entered the appropriate WLAN coverage area, the content requested by the user is delivered via the WLAN. Alternatively, the user is alerted in block 132 that the content is available for download from within the WLAN. In block 134, the user is billed by employing an accounting system of a service provider of the cellular network for downloading from the WLAN.

Having described preferred embodiments for multimedia content delivery through WLAN coverage area (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims.

The invention claimed is:

1. A method for wirelessly downloading a program to a mobile terminal, said method comprising:
    receiving, from a first wireless network, guide information related to programs available for downloading;
    selecting a particular program for downloading in response to the guide information;
    transmitting selection information to the first wireless network;
    detecting the presence of a coverage area of a second wireless network, the second wireless network and the first wireless network having an interworking function therebetween;
    attaching said mobile terminal to the second wireless network and authenticating said mobile terminal to the second wireless network via the first wireless network; and
    receiving the program from the second wireless network in response to the authentication.

2. The method of claim 1, further comprising:
    transmitting selection information to the second wireless network by said mobile terminal; and
    receiving the program from the second wireless network by said mobile terminal in response to the authentication and a comparison between the selection information transmitted to the first and second wireless networks.

3. The method of claim 1, wherein said guide information receiving step further includes receiving location information indicative of a location of the second wireless network.

4. The method of claim 3, wherein the guide information includes programs available for download at the second wireless network.

5. The method of claim 3, wherein the guide information includes programs available for download from the first wireless network through the second wireless network.

6. The method of claim 2, wherein the step of transmitting to the first wireless network comprises transmitting a program identification associated with the selected program.

7. The method of claim 6, wherein the step of transmitting to the second wireless network comprises transmitting a ciphered packet temporary mobile subscriber identifier and the program identification associated with the selected program.

8. The method of claim 1, wherein the first wireless network comprises a cellular network and the second wireless network comprises a wireless local area network.

9. An apparatus for wirelessly downloading a program, comprising:
    means for receiving, from a first wireless network, guide information related to programs available for downloading;
    means for selecting a particular program for downloading in response to the guide information and user input;
    means for transmitting selection information to the first wireless network;
    means for detecting the presence of a coverage area of a second wireless network, the second wireless network and the first wireless network having an interworking function therebetween;
    means for registering with the second wireless network and authenticating said apparatus via the first wireless network; and
    means for receiving the program from the second wireless network in response to the authentication.

10. The apparatus of claim 9, wherein the means for receiving guide information also receives location information indicative of a location of the second wireless network.

11. The apparatus of claim 9, wherein the means for transmitting to the first wireless network transmits a program identification associated with the selected program.

12. The apparatus of claim 11, wherein the means for transmitting to the second wireless network transmits a ciphered packet temporary mobile subscriber identifier and the program identification associated with the selected program.

13. The apparatus of claim 9, wherein the first wireless network comprises a cellular network and the second wireless network comprises a wireless local area network.

14. A method for transmitting a program to a mobile terminal from a first wireless network, said method comprising:
    coupling the first wireless network to a second wireless network via an interworking function;
    receiving identification information from a mobile terminal and registering the mobile terminal with the first wireless network;
    transmitting the mobile terminal identification information to the second wireless network via the interworking function;
    receiving by said mobile terminal authentication information from the second wireless network;
    receiving program identification information from the mobile terminal;
    receiving second program identification information from the second wireless network;
    comparing the program identification and the second program identification; and
    transmitting a requested program to the mobile terminal in response to the authentication information and the comparison of the first and second program identifications.

15. The method of claim 14, further comprising the step of storing a plurality of programs available for download in the second wireless network.

16. The method of claim 14, further comprising the step of receiving the requested program from the second wireless network and storing the requested program in the first wireless network prior to receiving the request from the mobile terminal.

17. The method of claim 14, further comprising the step of retrieving the requested program from the internet and storing the requested program in the first wireless network prior to receiving the request from the mobile terminal.

18. The method of claim 14, further comprising the steps of receiving a ciphered packet temporary mobile subscriber identifier from the mobile terminal and a second ciphered packet temporary mobile subscriber identifier from the second wireless network and transmitting the requested program in response to the comparison of the first and second ciphered packet temporary mobile subscriber identifiers and the first and second program identifications.

19. The method of claim 14, wherein the first wireless network comprises a wireless local area network and the second wireless network comprises a cellular network.

* * * * *